US006585817B2

(12) United States Patent
Lee et al.

(10) Patent No.: US 6,585,817 B2
(45) Date of Patent: *Jul. 1, 2003

(54) USES OF ORGANO-PHOSPHONIC ACIDS IN INK-JET INKS

(75) Inventors: Shirley Lee, Poway, CA (US); John Dangelewicz, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 159 days.

This patent is subject to a terminal disclaimer.

(21) Appl. No.: 09/847,069

(22) Filed: May 1, 2001

(65) Prior Publication Data

US 2002/0185037 A1 Dec. 12, 2002

Related U.S. Application Data

(63) Continuation-in-part of application No. 09/781,776, filed on Feb. 12, 2001, now Pat. No. 6,533,851.

(51) Int. Cl.⁷ .............................................. C09D 11/02
(52) U.S. Cl. ................. 106/31.58; 106/31.43; 106/31.75; 106/31.86
(58) Field of Search ................. 106/31.58, 31.43, 106/31.86, 31.75

(56) References Cited

U.S. PATENT DOCUMENTS

| 4,259,675 A | * | 3/1981 | Mansukhani ................ 347/100 |
| 5,106,414 A | | 4/1992 | Kunichika et al. ............. 106/2 |
| 5,181,045 A | | 1/1993 | Shields et al. ............... 346/1.1 |
| 5,254,159 A | | 10/1993 | Gundlach et al. ......... 106/31.43 |
| 5,554,213 A | | 9/1996 | Radigan, Jr. et al. .... 106/31.43 |
| 5,738,944 A | | 4/1998 | Fromson et al. ............ 428/409 |
| 5,785,743 A | | 7/1998 | Adamic et al. ........... 106/31.27 |
| 6,036,759 A | | 3/2000 | Wickramanayake et al. ..... 106/31.28 |
| 6,323,258 B1 | * | 11/2001 | Lin et al. ..................... 523/161 |

FOREIGN PATENT DOCUMENTS

| JP | 03193357 | 8/1991 |
| WO | WO98/44057 | 10/1998 |

* cited by examiner

Primary Examiner—Helene Klemanski

(57) ABSTRACT

Ink-jet ink compositions are described comprising at least one organo-phosphonic acid. The ink-jet ink compositions reduce adhesive swell, scale formation and corrosion, and as such lead to improved interactions with the structural materials of ink-jet printer pens.

29 Claims, No Drawings

USES OF ORGANO-PHOSPHONIC ACIDS IN INK-JET INKS

The present application is a continuation-in-part of U.S. Ser. No. 09/781,776 filed Feb. 12, 2001, now U.S. Pat. No. 6,533,851.

FIELD OF THE INVENTION

The present invention relates to ink compositions for ink-jet printing, and more particularly, to ink compositions that comprise organo-phosphonic acids.

BACKGROUND OF THE INVENTION

The combination of low cost and high quality output have recently made ink-jet printers a popular alternative to other types of non-impact printers such as laser printers.

The ink-jet printing process involves the ejection of fine droplets of ink onto a print medium such as paper in response to electrical signals generated by a microprocessor. Typically, an ink-jet printer utilizes a pen set mounted on a carriage that is moved relative to the surface of a print medium. In commercially available ink-jet color printers, such as the DESKJET™ printer available from Hewlett-Packard Company, a four-pen set including cyan, yellow, magenta and black inks is generally employed to achieve the necessary color combinations.

A typical pen includes print heads with orifice plates that have very small nozzles (10–50 μm diameter) through which the ink droplets are ejected. Adjacent to these nozzles are ink chambers where ink is stored prior to ejection. Ink drop ejection is currently achieved either thermally or piezoelectrically. In thermal ink-jet printing, each nozzle is associated with a resistor element. Each resistor element is in turn connected to a microprocessor, whose signals direct one or more resistor elements to heat up rapidly. This causes a rapid expansion of ink vapor that forces a drop of ink through the associated nozzle onto the print medium. In piezoelectric ink-jet printing, ink droplets are ejected due to the vibrations of piezoelectric crystals stimulated by electrical signals generated by the microprocessor.

A variety of complex interactions between the ink and pen structure (e.g. the resistor element, nozzle etc.) are known to affect both the short and long term reliability of pen performance and hence of print quality. Examples of these interactions include corrosion due to the presence of metal ion impurities or other reactive components in the ink composition; kogation, defined as the build up of residue on the surface of resistor elements; puddling, defined as the formation of ink puddles on the orifice plates of the print head; and crusting, defined as the formation of insoluble crusts on the orifice plates of the print head.

In addition, interactions between the ink and both the surface and bulk of the print medium also play a key role in determining print quality. For example, a particular concern for color ink-jet printing, has been the mixing or "bleeding" that occurs both on the surface and within the print medium when inks of two different colors are printed side by side. Several methods, including reducing dry times and increasing penetration rates, have been proposed to reduce bleed of adjacent printing liquids. In addition, pH-sensitive dyes may also be employed to control bleed.

U.S. Pat. No. 5,181,045 (incorporated herein by reference) discloses a method of ink-jet printing wherein one ink (a pH sensitive ink, usually a black ink) contains a colorant that becomes insoluble under defined pH conditions, and a second ink (the target ink, usually a color ink) has a pH that renders the colorant contained in the first ink insoluble. In this context, organic acids and particularly carboxylic acids such as for example glycolic, malonic, malic, maleic, succinic, glutaric, fumaric, citric, tartaric, and lactic acids have recently become popular components of acidic target ink-jet ink compositions (see for example, U.S. Pat. Nos. 5,785,743 and 6,036,759 both incorporated herein by reference).

Although these organic acids improve bleed control they can also be detrimental to pen performance. As an example, succinic acid is known to be corrosive to ferrous metals. It has also recently been observed that inks containing carboxylic acids such as succinic and glycolic acid cause an adhesive of ink-jet printer pens to swell. For example an adhesive (typically an epoxy adhesive) is used to attach the print head to the pen body, and as such, acts as a seal that prevents ink contained in the print head from leaking into the pen body. However if the adhesive swells, it risks bringing ink from the print head into contact with some of the electronic circuitry contained in the pen body, thereby causing a short circuit, and ultimately pen failure.

Accordingly, a need exists in the art for a means to produce ink compositions for ink-jet printers that control bleed and yet exhibit favorable interactions with the components of the pen structure and in particular with the adhesives commonly used in ink-jet printer pens.

SUMMARY OF THE INVENTION

The invention is an ink-jet ink composition. The composition comprises at least one colorant and a vehicle. Preferably the ink composition causes negligible adhesive swell.

The vehicle includes at least one organo-phosphonic acid. The vehicle may contain mixtures of two or more organo-phosphonic acids. The organo-phosphonic acid may be monofunctional or polyfunctional. Preferably the organo-phosphonic acid is polyfunctional. The concentration of organo-phosphonic acid may be from about 0.5 to about 20 wt %, for example from about 0.5 to about 10 wt %, from about 2 to about 10 wt %, or from about 5 to about 10 wt %.

The organo-phosphonic acids may be of general formula

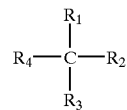

wherein $R_1$ and $R_2$ are phosphonic acid groups, and $R_3$ and $R_4$ can each, independently of each other, be hydrogen, a hydroxyl group, a phosphonic acid group, an alkyl group, an aryl group, or a substituted alkyl or aryl group having substituents selected from the group of alkyl groups, aryl groups, hydroxyl groups, phosphonic acid groups, ether groups, ester groups, and mixtures thereof. Preferably $R_2$ is a phosphonic acid group. More preferably $R_2$ is a phosphonic acid group, $R_3$ is a methyl group, $R_4$ is a hydroxyl group and the organo-phosphonic acid is hydroxyethylene di(phosphonic acid) (HEDP).

The organo-phosphonic acids may be of general formula

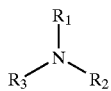

wherein $R_1$ is a methylene phosphonic acid group, and $R_2$ and $R_3$ can each, independently of each other, be hydrogen, a hydroxyl group, an alkyl group, an aryl group, or a substituted alkyl or aryl group having substituents selected from the group of alkyl groups, aryl groups, hydroxyl groups, phosphonic acid groups, ether groups, ester groups, and mixtures thereof. Preferably $R_2$ is a methylene phosphonic acid group. More preferably $R_2$ and $R_3$ are methylene phosphonic acid groups and the organo-phosphonic acid is amino tri(methylene phosphonic acid) (ATMP).

The organo-phosphonic acids may be of general formula

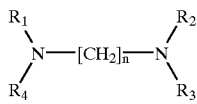

wherein n is an integer between 1 and 6, $R_1$ is a methylene phosphonic acid group, and $R_2$, $R_3$ and $R_4$ can each, independently of each other, be hydrogen, a hydroxyl group, an alkyl group, an aryl group, or a substituted alkyl or aryl group having substituents selected from the group of alkyl groups, aryl groups, hydroxyl groups, phosphonic acid groups, ether groups, ester groups, and mixtures thereof. Preferably $R_2$, $R_3$ and $R_4$ are methylene phosphonic acid groups. Preferably n=2 and the organo-phosphonic acid is ethylene diamine tetra(methylene phosphonic acid) (EDTMP), or n=6 and the organo-phosphonic acid is hexamethylene diamine tetra(methylene phosphonic acid) (HDTMP).

The organo-phosphonic acids may be of general formula

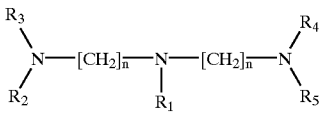

wherein n is an integer between 1 and 6, $R_1$ is a methylene phosphonic acid group, and $R_2$, $R_3$, $R_4$ and $R_5$ can each, independently of each other, be hydrogen, a hydroxyl group, an alkyl group, an aryl group, or a substituted alkyl or aryl group having substituents selected from the group of alkyl groups, aryl groups, hydroxyl groups, phosphonic acid groups, ether groups, ester groups, and mixtures thereof. Preferably $R_2$, $R_3$, $R_4$ and $R_5$ are methylene phosphonic acid groups. Preferably n=2, and the organo-phosphonic acid is diethylene triamine penta(methylene phosphonic acid) (DTPMP).

The vehicle may further include from about 0 to about 10 wt %, for example from about 0.1 to about 5 wt % surfactants, and from about 0.1 to about 50 wt %, for example from about 5 to about 30 wt % organic cosolvents. The pH of the ink composition may be from about 2 to about 9, for example from about 3 to about 6.

DESCRIPTION OF CERTAIN PREFERRED EMBODIMENTS

The invention will now be described with particular reference to certain preferred embodiments of the ink-jet ink compositions of the invention.

Exemplary embodiments of the ink compositions comprise, by weight (all percentages are by weight unless otherwise indicated) from 0.1 to 50%, preferably from 5 to 30% organic cosolvent; from 0 to 10%, preferably from 0.1 to 5% surfactant; from 0.5 to 15%, preferably from 0.5 to 5% colorant; and from 0.5 to 20%, preferably from 0.5 to 10%, 2 to 10% or 5 to 10% acid. The remainder of the ink compositions are mostly water. However, other components include biocides that inhibit growth of microorganisms such as the preservative PROXEL™ GXL (available from Avecia Incorporated), chelating agents such as EDTA that eliminate deleterious effects of heavy metal impurities, buffers, and viscosity modifiers. These may be added to improve various properties of the ink composition.

In a preferred embodiment of the invention, the ink compositions comprise, by weight, about 15% organic cosolvent, about 2% surfactant, about 2% colorant, and about 7% acid.

Organic Cosolvents

One or more organic cosolvents may be used to prepare the ink compositions of the present invention. In a preferred embodiment, the organic cosolvents are water-soluble. Many of the water soluble organic cosolvents known for use in ink-jet printing may be employed in the practice of this invention. For the purposes of clarification only, and not for limitation, some exemplary water-soluble organic cosolvents suitable for this purpose are set forth below.

Exemplary water-soluble organic cosolvents include, but are not limited to, aliphatic alcohols, aromatic alcohols, diols, triols, amides, ketones, polyketones or ketoalcohols, nitrogen-containing heterocyclic ketones, ethers, glycol ethers, polyglycol ethers, alkylene glycols, polyalkylene glycols, thioglycols containing alkylene groups, lower alkyl ethers of polyhydric alcohols and lactams.

The concentration of the organic cosolvents may range from 0.1 to 50 wt %, preferably from 5 to 30 wt %.

Surfactants

One or more water soluble surfactants may be employed in the formulation of a vehicle for the ink. Many of the water soluble surfactants known for use in ink-jet printing may be employed in the practice of this invention. For the purposes of clarification only, and not for limitation, some exemplary water soluble surfactants suitable for this purpose are set forth below.

For convenience, examples of surfactants are divided into two categories: (1) non-ionic and amphoteric and (2) ionic. The former class includes the TERGITOL™ and BRIJ™ families of alkyl polyethylene oxides (POEs), available from Union Carbide Corporation and the ICI Group, respectively; certain members of the ZONYL™ family of fluorosurfactants, available from DuPont Corporation; the FLUORAD™ family of fluorinated alkyl esters available from 3M Company; the TRITON™ family of alkyl phenyl POEs available from Union Carbide Corporation; the PLURONIC™ family of ethylene oxide/propylene oxide block copolymers available from BASF Corporation; the SURFYNOL™ family of acetylenic POEs available from Air Products Incorporated; POE esters; POE diesters; POE amines; and POE amides. U.S. Pat. No. 5,106,416 (incorporated by reference herein) discusses many of the surfactants listed above in greater detail. Amphoteric surfactants such as substituted amine oxides or members of the MACKAM™ family of octylamine choloroacetic adducts available from the McIntyre Group are also useful in the practice of this invention. Cationic surfactants such as protonated POE amines, and anionic surfactants such as members of the DOWFAX™ family of diphenyl sulfonate derivatives available from the Dow Chemical Company, and the CRODAFOS™ family of ethoxylated oleoalcohol phosphate esters available from Croda Incorporated, may also be used.

The ink composition of the present invention comprises by weight from 0 to 10%, preferably from 0.1 to 5%, surfactant.

Colorants

One or more colorants may be employed in the ink composition, typically dyes or pigments. The dye or pigments may be non-ionic, cationic, anionic, or mixtures thereof. Any of the color dyes or pigments known for use in ink-jet printing may be employed in the practice of this invention. For the purposes of clarification only, and not for limitation, some exemplary colorants suitable for this purpose are set forth below.

Suitable colorants for the present invention include but are not limited to aqueous dyes such as Reactive Red 180, Direct Blue 86, Direct Blue 199, Direct Yellow 132, Acid Yellow 132, Direct Red 9, Direct Red 32, Acid Yellow 23, Acid Blue 185, Acid Blue 9, Acid Red 17, Acid Red 52, and Acid Red 249.

Suitable colorants for the present invention include but are not limited to pigments such as the PALIOGEN™ and HELIOGEN™ pigment families available from BASF Corporation; the CHROMOPHTAL™ and MONASTRAL™ pigment families available from Ciba Speciality Chemicals Corporation; the TI-PURE™ family of titanium dioxide pigments available from DuPont Corporation; the MONARCH™ pigment family from Cabot Corporation; and the NOVOPERM™, HANSA™ and HOSTAPERM™ pigment families available from Clariant Corporation.

The ink composition of the present invention comprises by weight from 0.5 to 15%, preferably from 0.5 to 5% colorant.

Acids

One or more organo-phosphonic acids may be included in the ink composition of the present invention. The organo-phosphonic acid may be monofunctional or polyfunctional. Preferably the organo-phosphonic acid is polyfunctional. Examples of suitable organo-phosphonic acids include organo-phosphonic acids of general formula

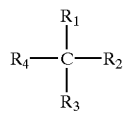

wherein $R_1$ and $R_2$ are phosphonic acid groups, and $R_3$ and $R_4$ can each, independently of each other, be hydrogen, a hydroxyl group, a phosphonic acid group, an alkyl group, an aryl group, or a substituted alkyl or aryl group having substituents selected from the group of alkyl groups, aryl groups, hydroxyl groups, phosphonic acid groups, ether groups, ester groups, and mixtures thereof. In one embodiment, $R_2$ is a phosphonic acid group. In a preferred embodiment, $R_2$ is a phosphonic acid group, $R_3$ is a methyl group, $R_4$ is a hydroxyl group and the organo-phosphonic acid is hydroxyethylene di(phosphonic acid) (HEDP, available as DEQUEST™ 2010 from Solutia Incorporated or as BRIQUEST™ ADPA-60AW from Albright & Wilson Americas Incorporated).

Other examples of organo-phosphonic acids that may be used according to the present invention include organo-phosphonic acids of general formula

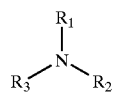

wherein $R_1$ is a methylene phosphonic acid group, and $R_2$ and $R_3$ can each, independently of each other, be hydrogen, a hydroxyl group, an alkyl group, an aryl group, or a substituted alkyl or aryl group having substituents selected from the group of alkyl groups, aryl groups, hydroxyl groups, phosphonic acid groups, ether groups, ester groups, and mixtures thereof. In one embodiment, $R_2$ is a methylene phosphonic acid group. In a preferred embodiment, $R_2$ and $R_3$ are methylene phosphonic acid groups and the organo-phosphonic acid is amino tri(methylene phosphonic acid) (ATMP, available as DEQUEST™ 2000LC from Solutia Incorporated or as BRIQUEST™ 301-50A from Albright & Wilson Americas Incorporated).

Yet other examples of organo-phosphonic acids that may be used according to the present invention include organo-phosphonic acids of general formula

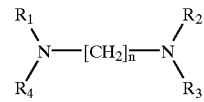

wherein n is an integer between 1 and 6, $R_1$ is a methylene phosphonic acid group, and $R_2$, $R_3$ and $R_4$ can each, independently of each other, be hydrogen, a hydroxyl group, an alkyl group, an aryl group, or a substituted alkyl or aryl group having substituents selected from the group of alkyl groups, aryl groups, hydroxyl groups, phosphonic acid groups, ether groups, ester groups, and mixtures thereof. In one embodiment, $R_2$ is a methylene phosphonic acid group. In another embodiment, $R_2$ and $R_3$ are methylene phosphonic acid groups. In yet another embodiment, $R_2$, $R_3$ and $R_4$ are methylene phosphonic acid groups. In a preferred embodiment, n=2 and the organo-phosphonic acid is ethylene diamine tetra(methylene phosphonic acid) (EDTMP, available as DEQUEST™ 2041 from Solutia Incorporated). In yet another preferred embodiment, n=6 and the organo-phosphonic acid is hexamethylene diamine tetra(methylene phosphonic acid) (HDTMP).

Yet other examples of organo-phosphonic acids that may be used according to the present invention include organo-phosphonic acids of general formula

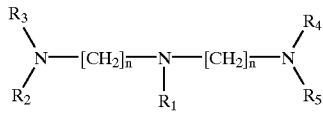

wherein n is an integer between 1 and 6, $R_1$ is a methylene phosphonic acid group, and $R_2$, $R_3$, $R_4$ and $R_5$ can each, independently of each other, be hydrogen, a hydroxyl group, an alkyl group, an aryl group, or a substituted alkyl or aryl group having substituents selected from the group of alkyl groups, aryl groups, hydroxyl groups, phosphonic acid groups, ether groups, ester groups, and mixtures thereof. In one embodiment, $R_2$ is a methylene phosphonic acid group. In another embodiment, $R_2$ and $R_3$ are methylene phosphonic acid groups. In yet another embodiment, $R_2$, $R_3$ and $R_4$ are methylene phosphonic acid groups. In yet another embodiment, $R_2$, $R_3$, $R_4$ and $R_5$ are methylene phosphonic acid groups. In a preferred embodiment, n=2 and the organo-phosphonic acid is diethylene triamine penta(methylene phosphonic acid) (DTPMP, available as DEQUEST™ 2060S from Solutia Incorporated or as BRIQUEST™ 543-45AS from Albright & Wilson Americas Incorporated). The ink composition of the present invention comprises by weight from 0.5 to 20%, preferably from 0.5 to 10%, 2 to 10%, or 5 to 10% organo-phosphonic acid.

EXAMPLES

For the purposes of clarification only, and not for limitation, some exemplary ink compositions of the present invention are set forth below.

Example 1

A Comparison of the Effects of Carboxylic, Organo-phosphonic and Inorganic Acids on Adhesive Swell Ink-jet ink compositions were prepared as shown in Table 1 (all values are weight percentages unless otherwise indicated). For each ink composition, nine identical pens with a cured epoxy resin adhesive (used in the HP DESIGN-JET™ 5000 printer) were prepared. In order to investigate the long term effects of the different ink compositions on adhesive swell, the pens were placed in a 60° C. oven for 6 weeks and then examined. The delamination distance, defined as the distance traveled by the ink from the adhesive/silicon die interface towards the center of the silicon die, was measured for each of the pens and the average value in $\mu$m for each of the ink compositions is listed in the last row of Table 1. Adhesive swell is considered "negligible" when the delamination distance after such a storage period remains less than 10 $\mu$m, preferably less than 5 $\mu$m, more preferably less than 2 $\mu$m.

TABLE 1

| Component | Ink 1 | Ink 2 | Ink 3 | Ink 4 |
|---|---|---|---|---|
| glycerol | 7.5 | 7.5 | 7.5 | 7.5 |
| Alkyl Diol | 5.0 | 5.0 | 5.0 | 5.0 |
| Alkyl Diol | 7.5 | 7.5 | 7.5 | 7.5 |
| Secondary Alcohol Ethoxylate | 0.5 | 0.5 | 0.5 | 0.5 |
| Fluoro Surfactant | 0.4 | 0.4 | 0.4 | 0.4 |
| glycolic acid | 5.0 | — | — | — |
| succinic acid | — | 7.8 | — | — |
| HEDP[2] | — | — | 5.7 | — |
| sulfuric acid | — | — | — | 3.4 |
| magenta dye | 2.0 | 2.0 | 2.0 | 2.0 |
| biocide | 0.2 | 0.2 | 0.2 | 0.2 |
| water | balance | balance | balance | balance |
| pH[3] | 3.8 | 3.8 | 3.8 | 3.8 |
| delamination distance ($\mu$m) | 55 | 41 | 0 | 0 |

[2]HEDP is hydroxyethylene di(phosphonic acid).
[3]The pH was adjusted by adding a sufficient amount of β-alanine buffer.

Inks 1 and 2 both comprise carboxylic acids—glycolic acid (OHCH$_2$COOH) and succinic acid (CH$_2$COOH)$_2$ respectively—and both cause significant adhesive swell that could potentially cause pens to fail. Inks 3 and 4 on the other hand, comprise an organo-phosphonic acid (HEDP) and an inorganic acid (H$_2$SO$_4$) respectively, and exhibit no adhesive swell.

Without wishing to be bound to any particular theory, it is believed that adhesive swell is, in this case, caused by a specific chemical reaction between carboxylic acids of the ink composition and reactive groups of the adhesive. As was mentioned earlier, the adhesive used in the experimental pens is a cured epoxy resin. These resins contain reactive hydroxyl groups which, under acidic conditions, are likely to react with carboxylic acids to form an ester: R—COOH+ R'—OH→R—COOR'+H$_2$O. Such an acid catalyzed esterification mechanism could conceivably cause the adhesive to swell.

Example 2

Effect of Acid Content and pH on Adhesive Swell When Using Organo-phosphonic Acids Ink-jet ink compositions containing various concentrations of HEDP (an organo-phosphonic acid) were prepared at different pH values as shown in Table 2 (all values are weight percentages unless otherwise indicated). As in Example 1, for each ink composition nine identical pens with a cured epoxy resin adhesive (used in the HP DESIGN-JET™ 5000 printer) were prepared, and placed in a 60° C. oven for 6 weeks prior to examination. As in Example 1, the adhesive swell delamination distance was measured for each of the pens and the average value in $\mu$m for each of the ink compositions is listed in the last row of Table 2.

TABLE 2

| Component | Ink 3 | Ink 5 | Ink 6 | Ink 7 |
|---|---|---|---|---|
| Glycerol | 7.5 | 7.5 | 7.5 | 7.5 |
| Alkyl Diol | 5.0 | 5.0 | 5.0 | 5.0 |
| Alky Diol | 7.5 | 7.5 | 7.5 | 7.5 |
| Secondary Alcohol Ethloxylate | 0.5 | 0.5 | 0.5 | 0.5 |
| Fluro Surfactant | 0.4 | 0.4 | 0.4 | 0.4 |
| HEDP[2] | 5.7 | 2.5 | 5.7 | 2.5 |
| magenta dye | 2.0 | 2.0 | 2.0 | 2.0 |
| Biocide | 0.2 | 0.2 | 0.2 | 0.2 |
| Water | balance | balance | balance | balance |
| pH[3] | 3.8 | 3.8 | 4.6 | 4.6 |
| delamination distance ($\mu$m) | 0 | 0 | 0 | 0 |

[2]HEDP is hydroxyethylene di(phosphonic acid).
[3]The pH was adjusted by adding a sufficient amount of β-alanine buffer.

For each of the inks, no adhesive swell was observed. These results indicate that organo-phosphonic acids are suitable acids of the ink composition over a range of acid concentrations and pH values.

What is claimed is:

1. An ink-jet ink composition, comprising at least one colorant and a vehicle, said vehicle including an organo-phosphonic acid of general formula

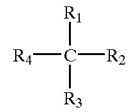

wherein $R_1$ and $R_2$ are phosphonic acid groups, and $R_3$ and $R_4$ can each, independently of each other, be hydrogen, a hydroxyl group, a phosphonic acid group, an alkyl group, an aryl group, or a substituted alkyl or aryl group having substituents selected from the group consisting of alkyl groups, aryl groups, hydroxyl groups, phosphonic acid groups, ether groups, ester groups, and mixtures thereof.

2. The ink-jet ink composition of claim 1, wherein said organo-phosphonic acid is hydroxyethylene di(phosphonic acid).

3. The ink-jet ink composition of claim 1, wherein said ink composition causes negligible adhesive swell.

4. The ink-jet ink composition of claim 1, wherein the concentration of said organo-phosphonic acid is in the range of about 0.5 wt % to about 20 wt %.

5. The ink-jet ink composition of claim 1, wherein the pH of the ink composition is between about 2 and about 9.

6. The ink-jet ink composition of claim 1, wherein the vehicle further comprises from about 0 to about 10 wt % surfactant.

7. The ink-jet ink composition of claim 1, wherein the vehicle further comprises from about 0.1 to about 50 wt % organic cosolvent.

8. An ink-jet ink composition, comprising at least one colorant and a vehicle, said vehicle including an organo-phosphonic acid of general formula

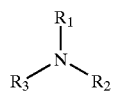

wherein $R_1$ is a methylene phosphonic acid group, and $R_2$ and $R_3$ can each, independently of each other, be hydrogen, a hydroxyl group, an alkyl group, an aryl group, or a substituted alkyl or aryl group having substituents selected from the group consisting of alkyl groups, aryl groups, hydroxyl groups, phosphonic acid groups, ether groups, ester groups, and mixtures thereof.

9. The ink-jet ink composition of claim 8, wherein said organo-phosphonic acid is amino tri(methylene phosphonic acid).

10. The ink-jet ink composition of claim 8, wherein said ink composition causes negligible adhesive swell.

11. The ink-jet ink composition of claim 8, wherein the concentration of said organo-phosphonic acid is in the range of about 0.5 wt % to about 20 wt %.

12. The ink-jet ink composition of claim 8, wherein the pH of the ink composition is between about 2 and about 9.

13. The ink-jet ink composition of claim 8, wherein the vehicle further comprises from about 0 to about 10 wt % surfactant.

14. The ink-jet ink composition of claim 8, wherein the vehicle further comprises from about 0.1 to about 50 wt % organic cosolvent.

15. An ink-jet ink composition, comprising at least one colorant and a vehicle, said vehicle including an organo-phosphonic acid of general formula

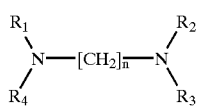

wherein n is an integer between 1 and 6, $R_1$ is a methylene phosphonic acid group, and $R_2$, $R_3$ and $R_4$ can each, independently of each other, be hydrogen, a hydroxyl group, an alkyl group, an aryl group, or a substituted alkyl or aryl group having substituents selected from the group consisting of alkyl groups, aryl groups, hydroxyl groups, phosphonic acid groups, ether groups, ester groups, and mixtures thereof.

16. The ink-jet ink composition of claim 15, wherein said organo-phosphonic acid is ethylene diamine tetra(methylene phosphonic acid).

17. The ink-jet ink composition of claim 15, wherein said organo-phosphonic acid is hexamethylene diamine tetra (methylene phosphonic acid).

18. The ink-jet ink composition of claim 15, wherein said ink composition causes negligible adhesive swell.

19. The ink-jet ink composition of claim 15, wherein the concentration of said organo-phosphonic acid is in the range of about 0.5 wt % to about 20 wt %.

20. The ink-jet ink composition of claim 15, wherein the pH of the ink composition is between about 2 and about 9.

21. The ink-jet ink composition of claim 15, wherein the vehicle further comprises from about 0 to about 10 wt % surfactant.

22. The ink-jet ink composition of claim 15, wherein the vehicle further comprises from about 0.1 to about 50 wt % organic cosolvent.

23. An ink-jet ink composition, comprising at least one colorant and a vehicle, said vehicle including an organo-phosphonic acid of general formula

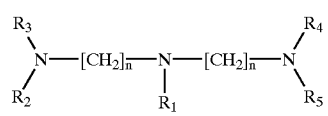

wherein n is an integer between 1 and 6, $R_1$ is a methylene phosphonic acid group, and $R_2$, $R_3$, $R_4$ and $R_5$ can each, independently of each other, be hydrogen, a hydroxyl group, an alkyl group, an aryl group, or a substituted alkyl or aryl group having substituents selected from the group consisting of alkyl groups, aryl groups, hydroxyl groups, phosphonic acid groups, ether groups, ester groups, and mixtures thereof.

24. The ink-jet ink composition of claim 23, wherein said organo-phosphonic acid is diethylene triamine penta (methylene phosphonic acid).

25. The ink-jet ink composition of claim 23, wherein said ink composition causes negligible adhesive swell.

26. The ink-jet ink composition of claim 23, wherein the concentration of said organo-phosphonic acid is in the range of about 0.5 wt % to about 20 wt %.

27. The ink-jet ink composition of claim 23, wherein the pH of the ink composition is between about 2 and about 9.

28. The ink-jet ink composition of claim 23, wherein the vehicle further comprises from about 0 to about 10 wt % surfactant.

29. The ink-jet ink composition of claim 23, wherein the vehicle further comprises from about 0.1 to about 50 wt % organic cosolvent.

* * * * *